United States Patent [19]

Shinada

[11] Patent Number: 4,707,710

[45] Date of Patent: Nov. 17, 1987

[54] METHOD OF DETECTING A DRIFT AMOUNT IN TWO-DIMENSIONALLY SCANNING A FORM SLIDE FILM AND A DETECTING APPARATUS

[75] Inventor: Hidetoshi Shinada, Kanagawa, Japan

[73] Assignee: Thomson-CSF, Paris, France

[21] Appl. No.: 801,711

[22] Filed: Nov. 26, 1985

[30] Foreign Application Priority Data

Nov. 29, 1984 [JP] Japan ................. 59-252688

[51] Int. Cl.⁴ ................. G01D 9/42; H04N 1/21
[52] U.S. Cl. ................. 346/108; 358/296
[58] Field of Search ................. 346/107 R, 108, 76 L; 358/285, 296, 302

[56] References Cited

U.S. PATENT DOCUMENTS 4,323,906  4/1982  Ohnishi ................. 346/108

Primary Examiner—E. A. Goldberg
Assistant Examiner—Mark Reinhart
Attorney, Agent, or Firm—Roland Plottel

[57] ABSTRACT

In the optical information recording apparatus, the form slide film having the sensor mark is two-dimensionally scanned so as to detect the drift amount in the vertical scanning direction due to the fluctuation of the optical system of the optical information recording apparatus. The scanning device scans the sensor mark within a predetermined scanning period to produce the pulse signals. The number of these pulse signals is counted and then compared with the reference number so as to produce a difference, i.e., the drift amount. The vertical scanning pitch of the scanning device is controlled based upon the drift amount.

21 Claims, 11 Drawing Figures

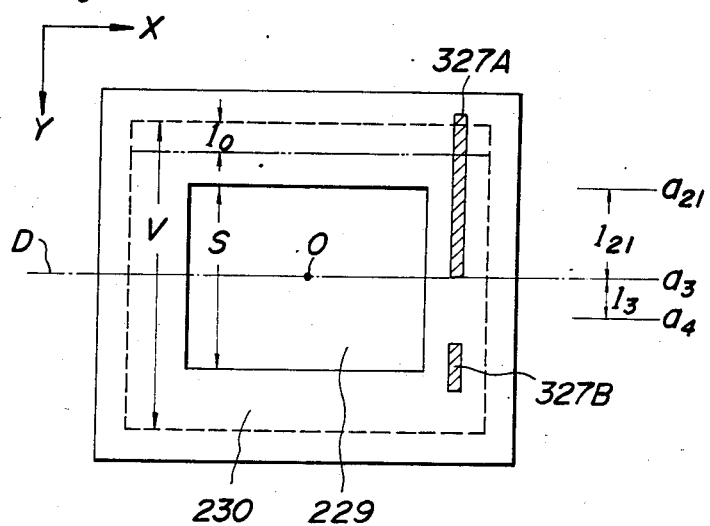
FIG_8

METHOD OF DETECTING A DRIFT AMOUNT IN TWO-DIMENSIONALLY SCANNING A FORM SLIDE FILM AND A DETECTING APPARATUS

BACKGROUND OF THE INVENTION

1. Field of the Invention

The present invention generally relates to a method of detecting a drift amount in scanning a form slide film of an optical information recording apparatus in which data information of the form slide is optically scanned by on two-dimensional scanning beam to be optically recorded on a recording medium by way of the raster scanning. More particularly, the present invention is directed to a method of detecting the drift amount occurring when the frame-information stored position of the form slide film is optically scanned with respect to the data stored position thereof and to an apparatus for detecting such a drift amount.

2. Description of the Prior Art

As such an information recording apparatus, a computer output microfilm apparatus (referred to as "laser-COM" hereinafter) is known, in which print data (variable information) supplied from the computer and desirable form data (fixed information) are recorded on microforms by employing a laser beam as scanning light.

An optical scanning system of the above-described laser-COM will now be summarized with reference to FIG. 1.

An argon (Ar) laser 1 emits blue green light beams for recording purposes, which are indicated by "B". The blue green light beams B are intensity-modulated in an optical modulator 2 by video signals (will be discussed later) and thereafter pass through a first dichroic mirror 3. A helium-neon (He - Ne) laser 4 emits red light beams for reading purposes, which are denoted by "R". The red light beams R are incident upon a first reflecting mirror 5 and reflected therein and thereafter incident on the first dichroic mirror 3. The red light beams R are reflected on the first dichroic mirror 3 and mixed with the other light beams for recording purposes that have passed through this dichroic mirror 3. The combined light beams are incident on a rotating polyhedric mirror 7 through a second reflecting mirror 6. In this case, the first dichroic mirror 3 is designed to pass the blue and green light beams therethrough and to reflect the red light beams thereon.

The rotating polyhedric mirror 7 is rotated in a predetermined direction at a constant rate by a motor 9 to which a power is supplied from a motor drive circuit 8. As a result, the combined light beams R, B incident upon the respective mirror surface of the rotating polyhedric mirror 7 are reflected on these mirror surfaces and simultaneously deflected (referred to as "horizontal-deflected beams"). Then, the mixed light beams are converted into primary scanning light having a repetition period that is defined by the beam reflections occur in the respective mirror surfaces of the rotating polyhedric mirror 7. The primary scanning light is incident upon a second dichroic mirror 11 via a convergent optical system 10. The second dichroic mirror has such characteristics that the recording blue-green light beams and the reading red light beams can be transmitted therethrough and a part of the reading red light beams can be reflected thereon. Accordingly, in the mixed light beams incident upon the second dichroic mirror 11, both the blue-green light beams B and the red light beams R pass toward a galvanometer 12, and the red light beams R are partially reflected and incident upon a linear encoder 13.

In response to saw-tooth driving signals supplied from a galvanometer driver 14, the galvanometer 12 deflects the recording light beams R, B in a direction substantially perpendicular to the horizontal deflecting direction (referred to as "vertical deflection"). As described above, the galvanometer driver 14 produces the saw-tooth driving signals based upon clock signals derived from a clock signal generator 15 (will be discussed later). For instance, counting these clock signals in a vertical address signal generator 16 in the vertical deflection period enables the vertical address signals to be produced. In response to these address signals, the galvanometer driver 14 produces the above-described saw-tooth driving signals.

Since the blue green light beams and also the red light beams vertically deflected by the galvanometer 12 have been converted into the one dimensional scanning light by the rotating polyhedric mirror 7, they become two dimensional scanning light by means of such vertical deflections. Then, the two dimensional scanning light is incident upon a third dichroic mirror 17, thereby splitting it into the blue green light and the red light.

The two dimensional scanning light of the blue green light beams passing through the third dichroic mirror 17 is focused on recording materials such as films via a focusing optical system 18 to raster-scan them. The other two dimensional scanning light of the red light beams split by the third dichroic mirror 17 is incident upon a form slide film 20A via a third reflecting mirror 19.

In a form slide film device 20, a plurality of form slide films 20A, 20B, --- , 20N (N being number) are preset which are the most useable. Different slide images and writing frames constituted by a plurality of vertical and horizontal lines are recorded on these slide films 20A, 20B, --- , 20N. For the sake of simplicity, only two form slide films 20A and 20B are illustrated. One of these form slide films is selectively moved to a scanning position where it is scanned by the above two dimensional scanning light. As desired, the form slide films 20A, 20B, --- , 20N are arbitrarily detachable from the form slide device 20.

As seen from FIG. 1, the two dimensional scanning light R passes through the form slide film 20A and is converted in a first photomultiplier 21 to electric readout signals. The readout signals correspond to video signals of the writing frame image of the scanned form slide film 20A.

The red light beams R split by the second dichroic mirror 11 are, on the other hand, incident upon a linear encoder 13 to be one-dimensional-scanned. The linear encoder 13 is formed by a plurality of transparent and non-transparent line-shaped grids which are aligned parallel to the horizontal deflection direction and equidistantly separated to form a straight striped pattern. Pulsatory light obtained by scanning this linear encoder 13 by means of the horizontal deflection scanning light is converted by a second photomultiplier 22 into pulse signals as clock pulse signals. By applying these clock pulse signals to a phase-coupling type clock signal oscillator 23, clock signals are oscillated. The clock signals are used to synchronize the respective circuit elements of the laser-COM with each other under the desirable timings. The linear encoder 13, second photomultiplier 22, and clock signal oscillator 23 constitute a clock signal generating device 15.

Under the timing control of the clock signals derived from the clock signal generating device 15, character information corresponding to coded data from the character information source such as magnetic tapes etc. can be read out from a character generator 24 as video signals. These video signals derived from the character generator 24 are supplied to a signal composite circuit 25. While they form signals that are obtained by amplifying outputs of the first photomultiplier 21 in the amplifier 26 and thereafter shaping them in a level slicer 27 are supplied to the signal composite circuit 25, the above video signals are combined with the form signals in the signal composite circuit 25.

Thus the composite video signals are supplied through a modulator drive circuit 28 to the optical modulator 2 so as to intensity-modulate the recording light beams. As easily seen, the raster-scanned image projected toward the film F corresponds to an image formed by that the print data derived from the computer is written in a given position of the form frame selected by the form slide film.

Such an information recording apparatus is known from, e.g., U.S. Pat. Nos. 4,323,906 and 4,340,894.

In such a laser-COM apparatus, the film F is known as "a microform" in a roll type film or a sheet-like film. A microfiche is most favorably employed as the sheet-like microfilm. Both the data information referred to as "variable information" such as characters produced from the character generator 24 based on the data input of the computer (not shown in detail) and also the fixed information such as frame information of the form slide film 20A positioned in the reading path are recorded in turn on such a microform with one page per one frame. That is, the fixed information read out from the form slide film 20A corresponds to image information having a properly arranged layout of frames, explanation etc. When the form slide film 20A is substituted by another one, it is possible to select the proper fixed information for displaying the data on the frame etc. When the typical microfiche is used as the microform, the fixed information and the variable information are recorded in the following format. This format is constituted of a plurality of frames that are arranged in both the vertical and horizontal directions in a predetermined sequence.

In optically recording the information according to the format, the fixed information of the desirable form slide film 20A optically read out by the form slide device 20 and the variable information such as character data generated from the character generator 24 must be recorded on the film F without any positional misalignment. Then a drift amount of the vertical scanning for the form slide film 20A with respect to the optical center position of the vertical scanning beam is detected in the conventional laser-COM apparatus so that the position of the vertical scanning beam is shifted to a predetermined position, e.g., the optical center position of the form slide film 20A so as to eliminate the drift.

Referring now to the form slide film 20A as shown in FIG. 2, a description will be made of the conventional drift detecting method for the vertical scanning direction. As previously described, the form slide film 20A is set on the two-dimensionally scanned position of the form slide device 20, so that the desirable frame information and the form image can be two-dimensionally scanned by the above-described raster. The symbol "X" denotes the horizontal scanning direction and the symbol "Y" indicates the vertical scanning direction. A form image region 122 having a width "S" in the vertical scanning direction "Y" is drawn by a solid line, while a raster scanning region 123 defined by an area of the form slide film 20A having a width "V" in the vertical scanning direction is shown by a broken line. This region 123 also covers the frame image region 122. The raster scanning region 123 includes an adjustment or region having a width of "$l_o$" because drift deviation of the raster scanning region 123 from the optical center "O" of the frame image region 122 can be adjusted by increasing or decreasing the number of the raster in the vertical direction, i.e., the vertical scanning pitch.

Elongate sensor marks 124, 125 and 126 for detecting the drift amount are intermittently formed in the right side out of the form image region 122 within the raster scanning region 123. As will be described hereinafter, when the raster intersects these sensor marks 124, 125 and 126, photoelectric conversion pulse signals are produced that corresponds to the number of the intersected rasters. These intersected rasters can be detected by way of the transmission mode or reflection mode. Thus, the number of the pulse signals corresponds to those of the raster intersecting the sensor marks.

The first-mentioned sensor mark 124 is formed in such a manner that one end of the sensor mark 124 is coincident with the scanning starting portion of the form image region 122 and a length thereof is denoted by "$L_1$", i.e., the other end thereof does not reach a straight line "D" in the horizontal scanning direction. This straight line "D" intersects the scanning center "O". A length of the second sensor mark 125 is denoted by "$L_2$" which is relatively shorter than that of the first sensor mark 124. This second sensor mark 125 intersects the above straight line "D". One end of the second sensor mark 126 terminates the scanning end portion of the form image region 122 and this mark 126 extends in the straight line "D" but does not reach this line "D". A length of this mark 126 is indicated by "$L_3$".

To detect a degree of the variation (i.e., an amount of the drift) on the relative position of the vertical scanning, when the form image is optically read from the form slide film 20A, the vertical address signal is compulsorily produced from the vertical address signal generator 16 so as to scan the optical center "O" of the form image region 122 by the straight line "D". This optical center "O" is determined by the optical components of the laser-COM apparatus. Accordingly, the galvanometer 12 can scan the position by receiving this vertical address signal, this position intersecting the optical center "O". From this center position, the vertical scanning commences so that the number of the pulse signals produced by intersecting the second sensor mark 125 is counted. If there is no drift in the scanning system and the first raster of the galvanometer 12 is coincident with the straight line "D" intersecting the optical center "O" upon receipt of the vertical address signal compulsorily produced from the vertical address signal generator 16, the number of the pulse signals produced by scanning a half length "$L_2/2$" of the second sensor mark 125 is equal to a predetermined constant value. When the resultant pulse numbers are greater than this constant value, the raster scanning of the second sensor mark 125 is probably carried out from the upper position (viewed in FIG. 2) above the optical center "O" although the galvanometer 12 is compulsorily driven so as to scan the optical center "O". In other words, the total scanning length is greater than "$L_2/2$. Conversely, if the resultant pulse numbers are smaller than the constant values, the raster scanning of the second sensor marks 125 commences below the optical center "O" due to the above-described drift phenomenon. That is, these pulse numbers are always constant if there is no drift.

In accordance with the conventional drift detection, the drift amount of the optical system is detected by comparing the resultant pulse number to the predetermined reference value. The comparison result corresponds to the variation amount, i.e., the drift amount of the relative position between the form image region 122 of the form slide film 20A and the raster scanning region 123 in the vertical direction. As a result, this amount of the drift can be used as an amount of the drift correction so as to adjust the number of the raster scanning in the specific region "$l_o$", i.e., the vertical scanning pitch. This is effected by controlling the optical axis of the vertical scanning beam, i.e., the central position of the vertical deflection.

Since there is no direct relation of the first and third sensor marks 124 and 126 with regard to the present invention, no further description is made.

The conventional drift detection method owns the following drawbacks. That is, the drift corrections are performed for the succeeding form slide films by employing the drift amount that has been detected for the first frame of the form slide film only. Accordingly, if there is a variation in the drift amount of the galvanometer 12, or other optical components due to the temperature variation, this variation cannot be corrected for the succeeding film scanning and recording. In other words, once the drift detection is performed, no further drift correction is effected in the conventional drift detection method.

As is well known, a plenty of the film frames are usually recorded on the microfiche, so that each of the film frames must be recorded with an extremely high reduction ratio. If there is positional deviation between the form image data and the character information data, the overlapped portion of both the image data may be produced. Even if the drift amount is corrected with respect to the first form slide film, the overlapped image recording may occur in the conventional laser-COM apparatus since the temperature variation causes the optical scanning by the raster to be deviated from a predetermined center position.

It is an object of the present invention is to overcome the conventional drawbacks in the drift correction and to provide a continuous drift detection for the succeeding form slide films.

It is another object to provide a simple drift detecting method in the vertical scanning.

It is a still object to provide a precise drift detecting method in the vertical scanning.

SUMMARY OF THE INVENTION

These objects and other features may be accomplished by providing a method of detecting a drift amount in a vertical scanning direction in two-dimensionally scanning a form slide film of an optical information recording apparatus, comprising steps of:

two-dimensionally scanning a sensor mark formed on the form slide film within a predetermined vertical scanning period by a raster beam so as to produce pulse signals by intersecting the sensor mark;

counting the number of the pulse signals within the predetermined vertical scanning period;

processing the counted number of the pulse signals in comparison with a reference number so as to produce the drift amount; and controlling a vertical scanning pitch of the raster beam based upon the drift amount.

Furthermore, these objects may be accomplished by providing:

an apparatus for detecting a drift amount in a vertical scanning direction in two-dimensionally scanning a form slide film of an optical information recording apparatus, comprising:

means for two-dimensionally scanning a sensor mark formed on the form slide film within a predetermined vertical scanning period by a raster beam so as to produce pulse signals by intersecting the sensor mark;

means for counting the number of the pulse signals within the predetermined vertical scanning period;

means for processing the counted number of the pulse signals in comparison with a reference number so as to produce the drift amount; and means for controlling a vertical scanning pitch of the raster beam based upon the drift amount.

BRIEF DESCRIPTION OF THE DRAWINGS

For a better understanding of these objects of the present invention, reference is made to the following detailed description of the invention to be read in conjunction with the following drawings, in which:

FIG. 8 schematically shows the form slide film comprising the sensor mark according to the other embodiment.

DETAILED DESCRIPTION OF PREFERRED EMBODIMENTS

Referring to a form slide film 220, a first preferred embodiment will now be described. The form slide film 220 includes a first sensor mark 227A and a second sensor mark 227B, the length of which is shorter than that of the former mark 227A. The form slide film 220 contains a form image region (consisting of the frame image and the fixed information data) 229 and a raster region 230. It is apparent that this raster region 230 covers not only the first and second sensor marks 227A and 228B, but also the form image region 229.

These sensor marks 227A and 227B are formed on the right side of the form image region 229 and extend along the vertical scanning direction "Y". One end of this first sensor mark 227A is coincident or aligned with the scanning starting portion of the form image region 229, while the other end of the mark 227A is in line with the straight line "D" intersecting the optical center "O" of this form image region 229. Thus the length of the first sensor mark 227A is denoted by "$L_4$" in the figures. The second sensor mark 227B is formed in such a manner that one end thereof is coincident with the scanning end portion of the form image region 229, while the other end thereof extends toward the above-mentioned straight line "D". That is, a length of the second sensor mark 227B includes several lines of the raster and is indicated by "$L_5$" in FIG. 3.

It should be noted that since the second sensor mark 227B is not directly related to the invention, no more detailed description is made.

Figure 3:
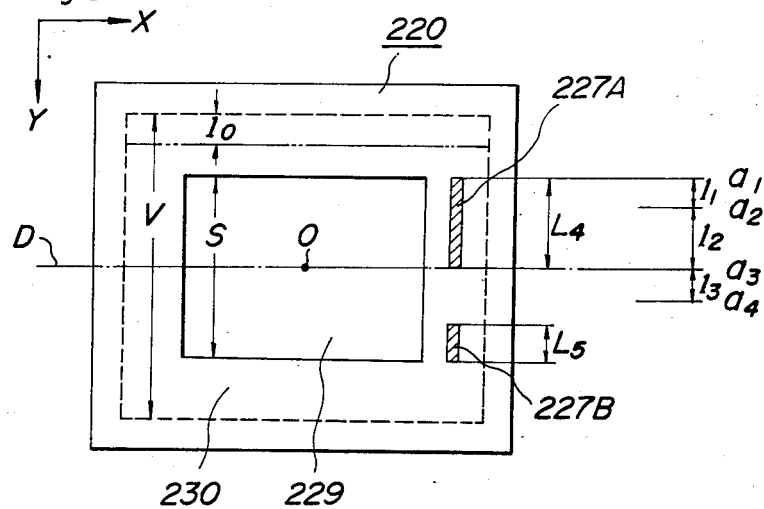
FIG. 3 schematically shows the form slide film comprising the sensor mark according to one preferred embodiment of the invention.

As easily understood from FIG. 3, there is provided the spare region "$l_o$" within the raster scanning region 230, extending in the vertical scanning range "V". The aim of the spare region "$l_o$" is the same as in the conventional form slide film. That is, this spare region "$l_o$" is used to correct the drift amount, or the relative positional deviation between the raster scanning region 230 and the optical axis of the vertical scanning (will be described in detail).

Referring to a block diagram of the drift detection circuit shown in FIG. 4 according to the invention, a description will be made how to detect such a drift amount of the form slide film 220.

Figure 1:
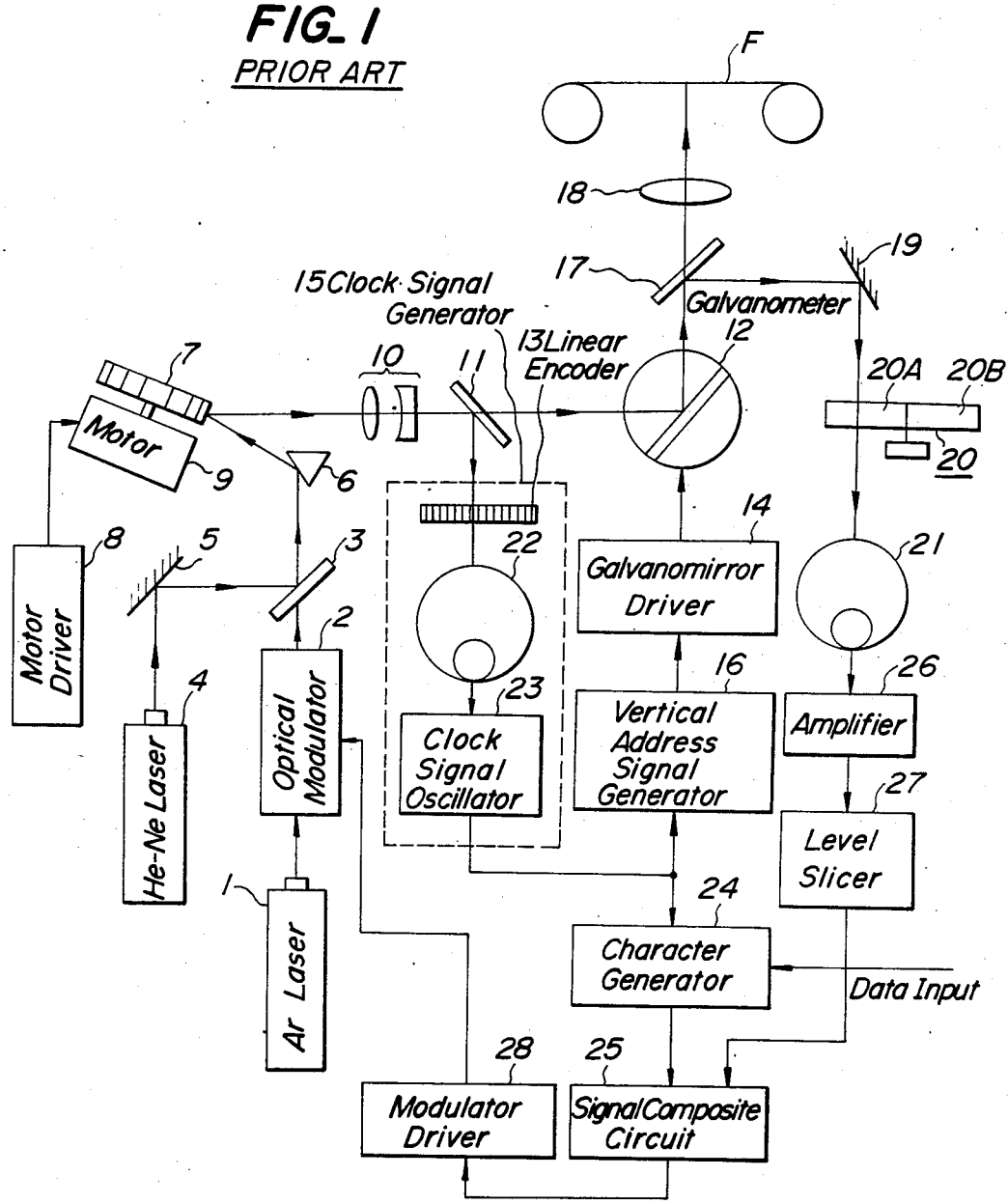
FIG. 1 is a schematic block diagram of the conventional optical information recording apparatus.
Figure 2:
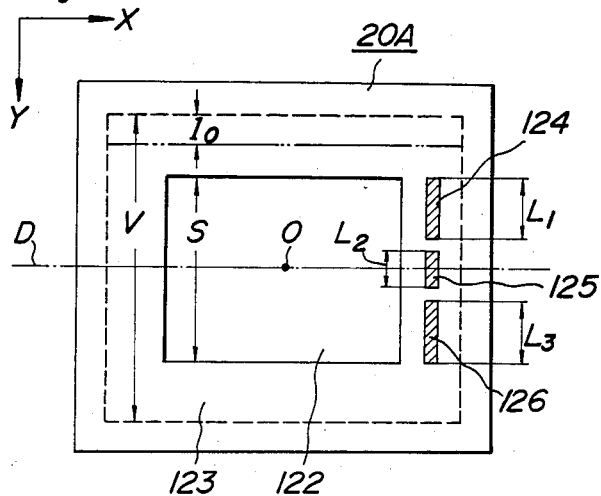
FIG. 2 schematically shows the conventional form slide film comprising the sensor marks.

The form slide film 220 is set on the scanning position of the form slide device 20 shown in FIG. 1. Prior to reading the form image information and the fixed information data from the form slide film 220, the following provisional, or dummy scanning is required so as to detect the drift amount. This provisional scanning is carried out several times.

Figure 4:
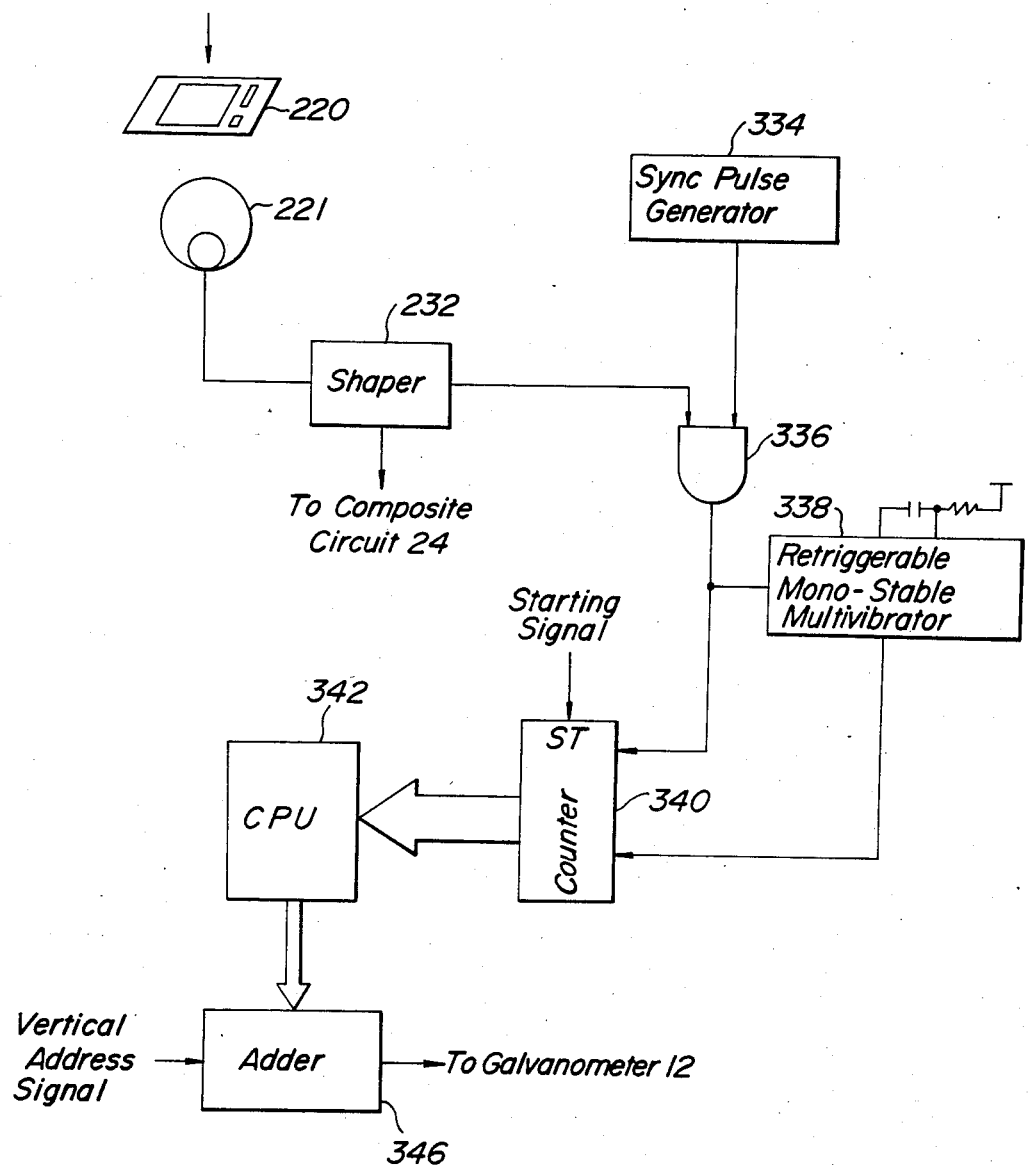
FIG. 4 is a schematic block diagram of the basic drift detection circuit.

The drift detection circuit as shown in FIG. 4 includes a photosensor 221, a shaper 232, a sync pulse generator 334, an AND gate 336, a retriggerable mono-stable multivibrator 338, a counter 340, a central processing unit (CPU) 342 and an adder 346. Operation of this drift detection circuit will now be simply made. When the form slide film 220 is two-dimensionally scanned in the provisional scanning mode, the output signals are derived from the photosensor 221 because the scanning beam intersects the first and second sensor marks 227A and 227B. The output signals are shaped in the shaper 232 and then supplied to one input of the AND gate 336. The sync pulse signal is supplied to the other input of the AND gate 336.

It should be noted that since the output signals of the photosensor 221 contain not only the form image data but also the sensor mark data, the AND gate 336 can derive the sensor mark pulse signal only by receiving the sync pulse signal from the sync pulse generator 334.

Then the sensor mark pulse signal is supplied to the counter 340, thereby the number of the sensor mark pulse signal being counted. The sensor mark pulse signal is also supplied to the retriggerable mono-stable multivibrator 338 so as to detect the last pulse of the sensor mark pulse signal. When the retriggerable mono-stable multivibrator 338 detects the last pulse, it delivers an output signal to the counter 340 so as to stop the counting operation of the counter 340. As a result, the counter 340 can detect how many the output pulses have been produced from the photosensor 221. Then, the counting result is processed in the central processing unit 342 so as to obtain a correction value for the drift. Thus the correction value is added to the value "$l_o$", thereby controlling the driving mode, i.e., the vertical scanning pitch of the galvanometer 12.

During the provisional scanning, the pulse signals corresponding to the pulse number of the raster intersecting the first sensor mark 227A can be derived every vertical scanning period. Assuming that the vertical address of the raster for scanning of the starting portion of the first sensor mark 127A is denoted by "$a_1$", the vertical address of the raster for scanning the portion shifted from "$a_1$" by "$l_1$" downwardly is defined by "$a_2$", the vertical address of the raster for scanning the optical center "O" is indicated by "$a_3$", and the vertical address of the raster for scanning the portion shifted from "$a_3$" by "$l_3$" downwardly, the output pulses of the photosensor 221 are detected as the reference scanning line number when a part of the first sensor mark 227A defined by the vertical address "$a_2$" to "$a_3$" is scanned by the raster under the condition of no drift in the scanning optical system (see FIG. 3). According to the present invention, it is designed that the counter 340 does not count the pulse number of the raster for scanning a part of the first sensor mark 227 defined by the vertical addresses "$a_1$" to "$a_2$". In other words, when the raster for scanning the optical center "O" defined by the vertical address "$a_3$" is not aligned with the above-described straight line "D", the output pulse number corresponds to the number corresponds to the drift amount of the laser-COM apparatus.

Therefore, the drift detection according to the present invention is to compare the detected output pulse number for the vertical addresses "$a_2$" to "$a_3$" with the above-described reference scanning line number.

It should be noted that it is necessary to determine these lengths "$l_1$" and "$l_3$" long enough to cover the maximum drift amount.

Figure 5A:
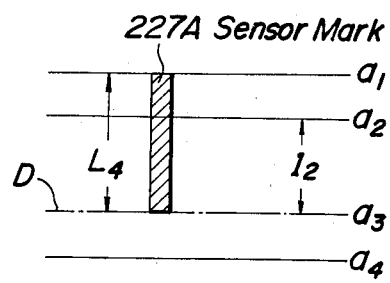
FIGS. 5A to 5C show illustrations useful in explaining the relationship between the vertical addresses and the sensor mark.

Now a description will be made of a relationship between the sensor mark 227A and the vertical addresses "$a_1$" to "$a_4$" with reference to FIGS. 5A to 5C. FIG. 5A shows "no drift" case in which the number of the pulse signals produced by vertically scanning the length "$l_2$" of the sensor mark 227A is always constant, and therefore recognized a reference number or as a reference scanning line number.

Figure 5B:
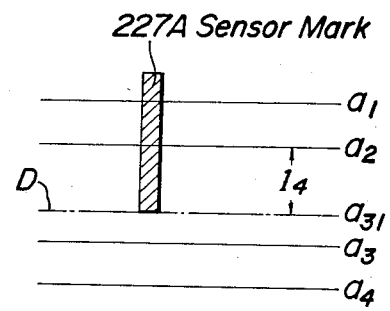

In FIG. 5B, the scanning line designated by the vertical address "$a_3$" is not coincident with the straight line "D" intersecting the optical center "O" of the form slide film, but positioned below this optical center "O". The number of the scanning line for intersecting the sensor mark 227A is counted by the counter 340 of the drift detection circuit, while the counting operation is similarly effected between the vertical address "$a_2$" and the vertical address "$a_4$". As seen from the sensor mark-vertical address relationship as shown in FIG. 5B, the length of the sensor mark 227A which is vertically scanned by the horizontal scanning line is represented by "$l_4$" and is apparently shorter than that of "$l_2$" (see FIG. 5A). Accordingly, the number of the pulse signals produced by the counter 340 is smaller than the reference number of FIG. 5A, because the scanning end portion of the sensor mark 227A is represented by the vertical address "$a_{31}$" which is located before the vertical address "$a_3$" in the scanning sequence. Thus, the smaller counting value of FIG. 5B corresponds to the drift amount caused by the fluctuation in the optical system of the laser-COM apparatus. Then this drift amount is properly processed in CPU 342 to produce the correction signal. Based on this correction signal, the lines of the spare region "$l_o$" are reduced by a predetermined value and the encoded data counting the character information etc. derived from the character generator 24 is controlled to be recorded, so that the character information data and the fixed information data are coincident with each other on the microfilm F.

Figure 5C:
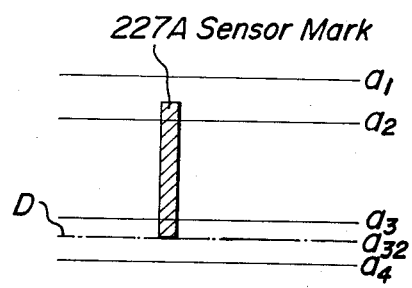

Conversely, as shown in FIG. 5C, the straight line "D" intersecting the optical center "O" is located below the line of the address "$a_3$". Since the number of the pulse signals produced by scanning the sensor mark 227A between the vertical addresses "$a_2$" and "$a_{32}$" is greater than the reference number, another different correction signal corresponding to another drift amount ($a_{32}-a_3$) is obtained from CPU 342. As a result, the lines of the spare region "$l_0$" are increased by a predetermined value which is determined by the above drift value ($a_{32}-a_3$"). When the character information data from the character generator 24 is properly combined with the fixed information data of the form slide film 220 on the microfilm F, then the drift amount in the vertical scanning direction can be precisely corrected by changing the vertical scanning pitch.

The basic operation of the present invention will now be summarized.

The number of the pulse signals obtained during the respective provisional scanning of the form slide film 20 (20A; 20B; 220) is compared to the reference number to produce a difference. This difference is used to produce the correction signal in CPU 342. This correction signal is then used to control the vertical scanning pitch drive of the galvanometer (12) so as to coincide the axis of the vertical scanning line with the optical center "O". In other words, the scanning position of the vertical scanning line is automatically controlled with respect to the optical center "O", thereby accurately correcting the drift amount caused by the optical system of the laser-COM apparatus.

Various modifications can be easily conceived by those skilled in the art according to the invention.

Figure 6A:
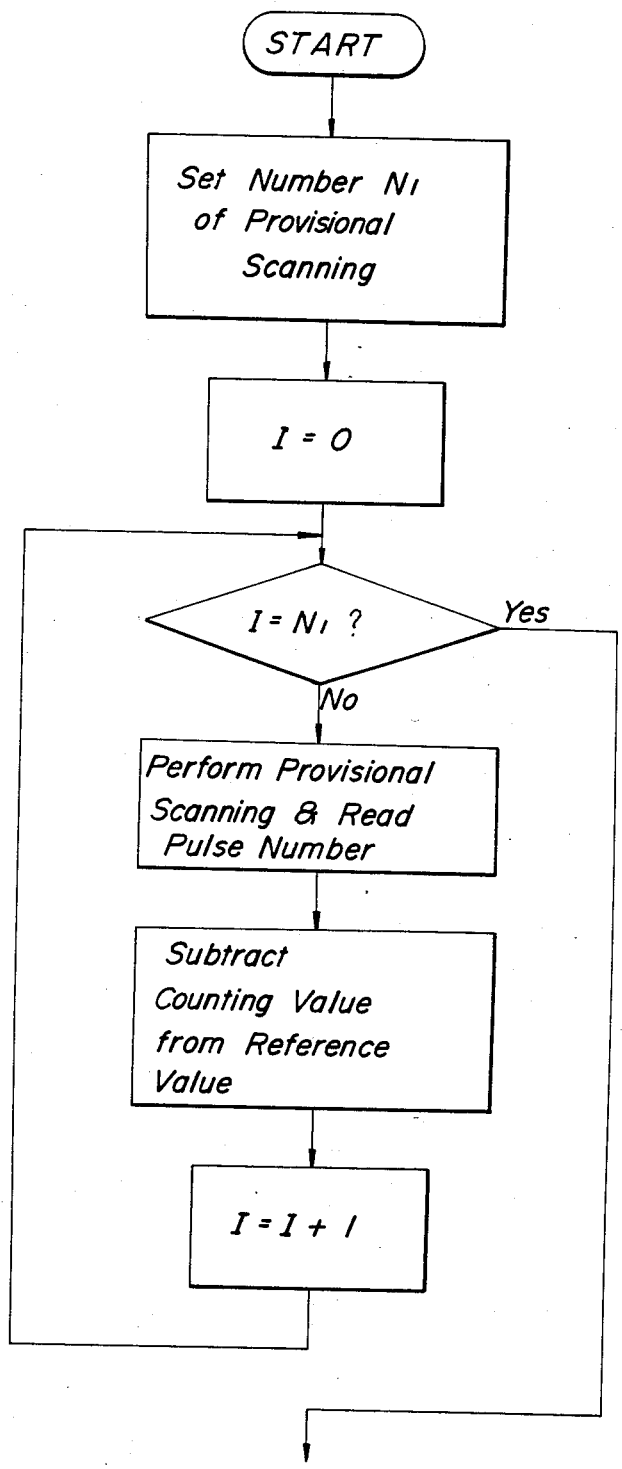
FIGS. 6A, 6B and 7 are flow charts of the drift corrections accounting to the embodiments.
Figure 6B:
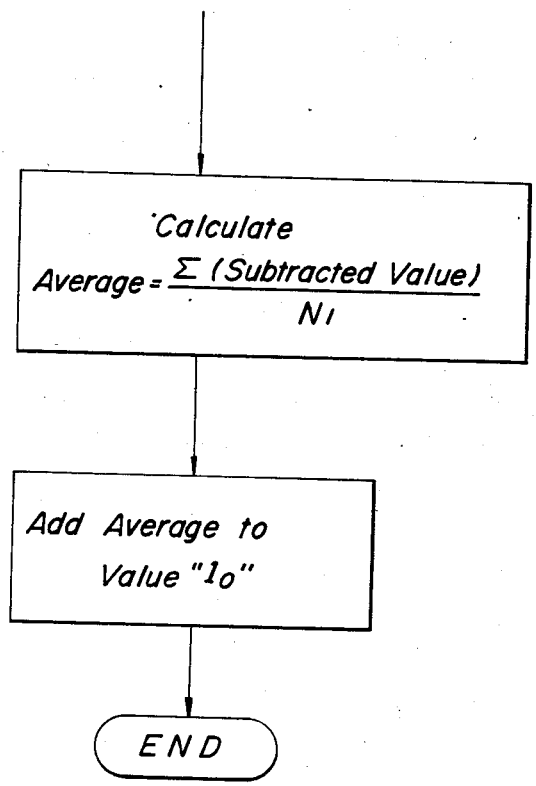

First, the provisional scannings for detecting the drift amounts are carried out for a plurality of the form slide films prior to the respective actual scannings thereof. The resultant differences from the reference pulse number are averaged to produce another correction value. This correction value is used to produce a typical correction signal. A further process of this correction signal is the same as the above-described embodiment. The entire operation of this second embodiment can be understood from a flow chart shown in FIGS. 6A and 6B. Moreover, it is very obvious that such operation of the second embodiment is effected based upon a program stored in a memory (not shown in detail) of CPU 242 in the drift detection circuit shown in FIG. 4.

Figure 7:
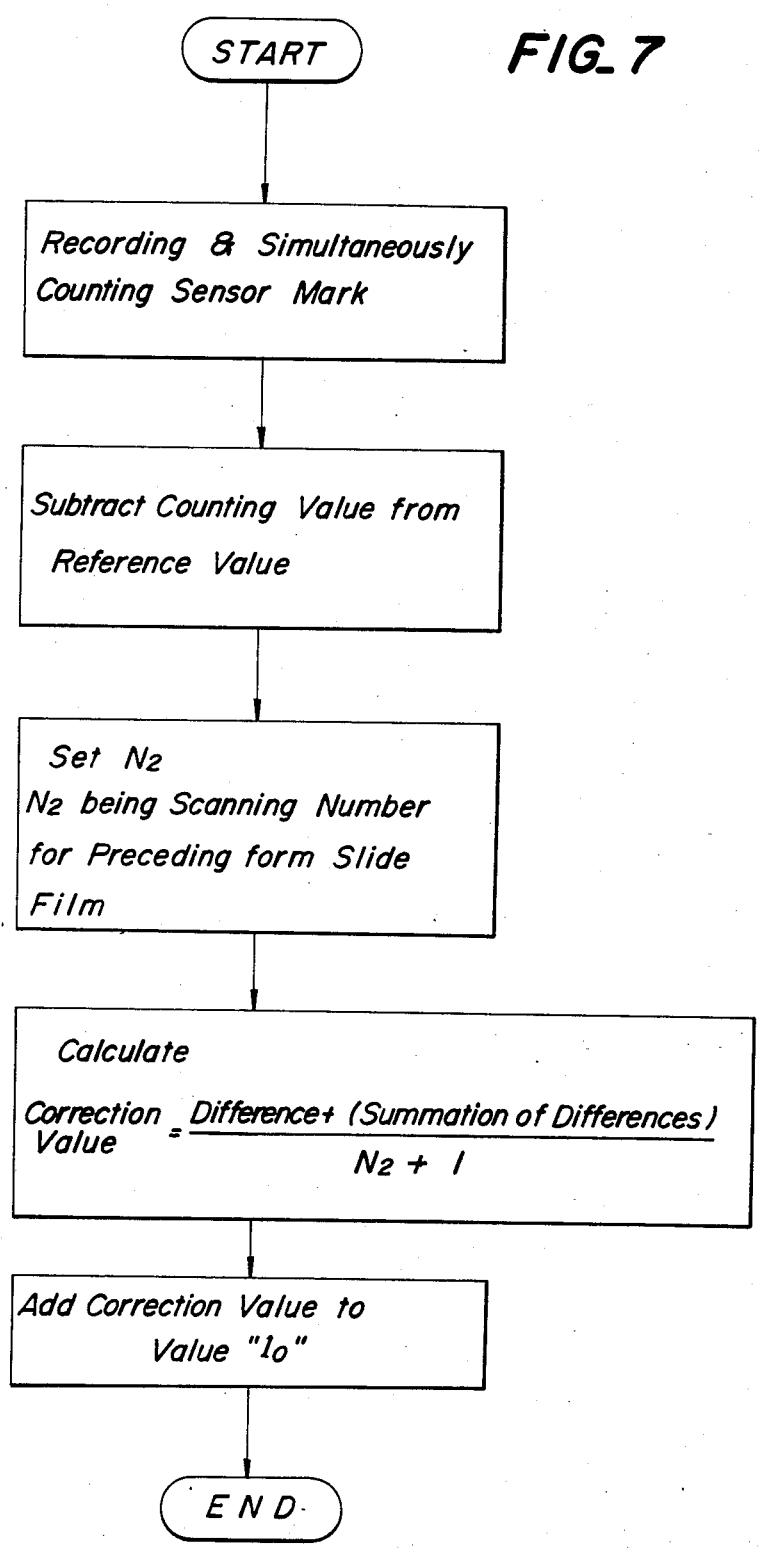

A third embodiment to obtain the correction signal for the drift amount will now be described with reference to a flow chart of FIG. 7. Since the step for adding the average value to the value "$l_0$" is the same as in the previous embodiment, no explanation is made there and also in the flow chart of FIG. 7. In this case, the recording operations of the second and the succeeding form slide films are simultaneously effected with the sensor mark counting. For instance, the correction value for the sixth form slide film 20F is obtained by averaging five comparison differences of the previous five form slide films 20A, 20B, 20C, 20D and 20E. Then this correction value is added to the lines of the spare region "$l_0$" to control the drift correction, i.e., the vertical scanning pitch by the galvanometer 12 for the sixth form slide film 20F.

According to this embodiment, since the film scanning for the information recording is simultaneously performed with the drift detection, the drift correction is carried out for both the variable information such as characters of the computer output data and the fixed information of the form film image. Then, the drift amount of the recording operations for the first and succeeding frames on the microfiche and also the fluctuation in the drift amount due to temperature variations of the galvanometer can be substantially completely corrected.

In the previous embodiments, the length of the sensor mark 227A was selected to be a half of the vertical size of the form slide image region 229, i.e., 20 mm with 1.5 mm (width) under the scanning pitch of approximately 4 $\mu$m in the vertical scannig direction. It is however possible to chose other lengths. For instance, as shown in FIG. 8, the length of the sensor mark 327A extends over the scanning starting portion of the form slide image region 229. In accordance with this embodiment, as the vertical address "$a_{21}$" of the scanning starting position is located below the spare region "$l_0$" and thus the effective scanning period "$l_{21}$" is longer than that of "$l_2$", more accurate drift correction can be expected.

As to the drift correction control method, the previous embodiments employed the addition or reduction of the spare region "$l_0$" by the correction value. It is alternatively possible to employ other known methods. For example, the above-described correction value is superimposed on the drive signal of the galvanometer 12 after processing the correction value in a D/A-converter (not shown) and thereafter summing the analog-converted correction value to the original drive signal of the galvanometer. As a result, the deflection center of the vertical scanning beam for the form slide film is deviated by a degree corresponding to the drift amount.

In the preceding embodiments, the sensor mark 227A was optically read out by the photodetector 21. If such an optical mark reading is difficult from other reading of the fixed information, an independent photosensor is provided to detect only the sensor mark.

It is also possible to employ correction methods other than the above methods. For instance, the average value may be calculated after deleting the maximum and minimum differences from the entire results.

While have been described in detail in the previous embodiments, the form slide film is provisionally scanned, prior to the actual scanning operation for the recording purpose, so as to detect the drift amount, resulting in an easy drift correction.

Furthermore, in the conventional drift detection method, no drift correction is practically effected for the second and the succeeding frames of the microfiche. To the contrary, according to the present invention, the drift detection and simultaneously the information recording can be effected by employing the drift correction value which is obtained by the averaged value of a plurality of drift amounts. Accordingly, all of the frames of the microfiche can be drift-checked and drift-corrected according to the invention.

What is claimed is:

1. A method of detecting a drift amount in a vertical scanning direction in two-dimensionally scanning of a form slide film of an optical information recording apparatus, comprising steps of:

two-dimensionally scanning a sensor mark formed on the form slide film within a predetermined vertical scanning period by a raster beam so as to produce pulse signals by intersecting the sensor mark;
  counting the number of the pulse signals within the predetermined vertical scanning period;

processing the counted number of the pulse signals in comparison with a reference number so as to produce the drift amount; and controlling a vertical scanning pitch of the raster beam based upon the drift amount.

2. A method of detecting a drift amount as claimed in claim 1, wherein said processing step includes a step of subtracting the counted number of the pulse signals from the reference number to derive a difference, said difference corresponding to the drift amount.

3. A method of detecting a drift amount as claimed in claim 1, wherein said processing step includes:
   a first step of subtracting a plurality of counted numbers of the pulse signals which are produced by repeating the two-dimensional scanning for a plurality of the form slide films, from the reference number so as to obtain a plurality of differences; and
   a second step of averaging said plurality of differences so as to obtain an averaged difference corresponding to the drift amount.

4. A method of detecting a drift amount as claimed in claim 1, wherein said processing step includes;
   a first step of subtracting a plurality of the counted numbers of the pulse signals which are produced by repeating the two-dimensional scanning for a plurality of the form slide films, from the reference number so as to obtain a plurality of differences;
   a second step of summing said plurality of differences to another difference obtained by scanning the succeeding form slide film; and
   a third step of averaging the summed differences obtained in the second step so as to derive an average value of the summed differences, said average value corresponding to said drift amount.

5. A method of detecting a drift amount as claimed in claim 3, wherein said processing step further includes a step of eliminating maximum and minimum differences from said plurality of differences before averaging said plurality of differences.

6. An apparatus for detecting a drift amount in a vertical scanning direction in two-dimensionally scanning of a form slide film of an optical information recording apparatus, comprising;
   means for two-dimensionally scanning a sensor mark formed on the form slide film within a predetermined vertical scanning period by a raster beam so as to produce pulse signals by intersecting the sensor mark;
   means for counting the number of the pulse signals within the predetermined vertical scanning period;
   means for processing the counted number of the pulse signals in comparison with a reference number so as to produce the drift amount; and
   means for controlling a vertical scanning pitch of the raster beam based upon the drift amount.

7. An apparatus for detecting a drift amount as claimed in claim 6, wherein said processing means includes a subtracting device for subtracting the counted number of the pulse signals from the reference number.

8. An apparatus for detecting a drift amount as claimed in claim 6, wherein said processing means includes;
   a subtracting device for subtracting a plurality of counted numbers of the pulse signals which are produced by repeatedly performing said two-dimensional scanning so as to obtain a plurality of differences; and
   an averaging device for averaging said plurality of differences so as to obtain an averaged difference corresponding to the drift amount.

9. An apparatus for detecting a drift amount as claimed in claim 6, wherein said counting means is a counter for receiving the pulse signals which are derived from the scanning means within said predetermined vertical scanning period.

10. An apparatus for detecting a drift amount as claimed in claim 6, wherein said scanning means includes at least
    a photodetector for photoelectrically converting the scanned raster beam into electronic signals;
    a sync pulse generator for generating a sync pulse signal;
    and AND gate for gating the electronic signals by receiving the sync pulse signal so as to derive only the pulse signals to be counted in the counting means.

11. An apparatus as claimed in claim 6, wherein said processing means is constructed of a central processing unit including a memory.

12. An apparatus as claimed in claim 6, wherein said sensor mark has a length of approximately 20 mm and a width of approximately 1.5 mm.

13. An apparatus as claimed in claim 6, wherein said scanning means is operated by a scanning pitch of approximately 4 $\mu$m in the vertical scanning direction.

14. A method of detecting a drift amount in a vertical scanning direction in two-dimensionally scanning of a form slide film of an optical information recording apparatus, comprising the steps of:
    a first step of two-dimensionally scanning a sensor mark formed on the form slide film within a predetermined vertical scanning period by a raster beam so as to produce pulse signals by intersecting the sensor mark;
    a second step of counting the number of the pulse signals within the predetermined vertical scanning period;
    performing said first and second steps a plurality of times, and subtracting each of the counted number of pulse signals from a reference number to obtain a plurality of differences;
    averaging said plurality of differences so as to obtain an averaged difference corresponding to a drift amount; and
    controlling a vertical scanning pitch of the raster beam based upon the drift amount.

15. A method as claimed in claim 14, additionally comprising the step of:
    repeating the first, second, performing, averaging and controlling steps prior to every respective recording operation performed with said optical image recording apparatus.

16. A method as claimed in claim 15, wherein the plurality of differences obtained from the prior succeeding recording operation are further included in the differences which are averaged to correspond to said drift amount.

17. A method as claimed in claim 14, wherein said form slide film has a form image region of length S, said sensor mark being formed adjacent to said form image region and having a length which is parallel to and at least one-half the length of said form image region length.

18. A method of detecting a drift amount as claimed in claim 14, wherein said processing step further includes a step of eliminating maximum and minimum differences from said plurality of differences before averaging said plurality of differences.

19. An apparatus for detecting a drift amount in a vertical scanning direction in two-dimensionally scanning of a form slide film of an optical information recording apparatus, comprising:

means for two-dimensionally scanning a sensor mark formed on the form slide film within a predetermined vertical scanning period by a raster beam so as to produce pulse signals by intersecting the sensor mark;

means for counting the number of the pulse signals within the predetermined vertical scanning period;

a subtracting device for subtracting from a reference count number, said counted numbers of pulse signals which are produced by repeatedly performing said two-dimensional scanning so as to obtain a plurality of differences;

an averaging device for averaging said plurality of differences so as to obtain an averaged difference corresponding to the drift amount; and means for controlling a vertical scanning pitch of the raster beam based upon the drift amount.

20. An apparatus for detecting a drift amount as claimed in claim 19, wherein said counting means is a counter for receiving the pulse signals which are derived from the scanning means within said predetermined vertical scanning period.

21. An apparatus for detecting a drift amount as claimed in claim 19, wherein said scanning means includes at least:

a photodetector for photoelectrically converting the scanned raster beam into electronic signals;

a sync pulse generator for generating a sync pulse signal; and an AND gate for gating the electronic signals by receiving the sync pulse signals so as to derive only the pulse signals to be counted in the counting means.

* * * * *

UNITED STATES PATENT AND TRADEMARK OFFICE
CERTIFICATE OF CORRECTION

PATENT NO. : 4,707,710

DATED : November 17, 1987

INVENTOR(S) : Hidetoshi Shinada

It is certified that error appears in the above-identified patent and that said Letters Patent is hereby corrected as shown below: On the title page;

[73] Assignee:  FUJI PHOTO FILM CO., LTD.
Kanagawa, Japan.

--Attorney, Agent, or Firm - Sughrue, Mion, Zinn, Macpeak and Seas--.

Column 6, line 58, delete "228B", and insert --227B--.

Signed and Sealed this

Third Day of July, 1990

*Attest:*

HARRY F. MANBECK, JR.

*Attesting Officer*   *Commissioner of Patents and Trademarks*